United States Patent [19]
Alexander

[11] Patent Number: 5,548,993
[45] Date of Patent: Aug. 27, 1996

[54] GAS SERVICE TESTING GAUGE

[76] Inventor: Brent K. Alexander, 80 Cass Ave., West Springfield, Mass. 01089-2424

[21] Appl. No.: 426,050

[22] Filed: Apr. 21, 1995

[51] Int. Cl.⁶ .................................................. G01M 3/04
[52] U.S. Cl. ........................ 73/49.5; 73/49.1; 73/40.5; 73/40.5 R
[58] Field of Search ........................ 73/49.5, 40.5, 73/49.1

[56] References Cited

U.S. PATENT DOCUMENTS

| | | | |
|---|---|---|---|
| 3,756,072 | 9/1973 | MacMurray | 73/40.5 R |
| 4,063,317 | 12/1977 | Santore | 4/255 |
| 4,722,221 | 2/1988 | Ferguson | 73/168 |
| 4,895,018 | 1/1990 | Asbra | 73/40.5 R |
| 4,998,434 | 3/1991 | Asbra | 73/40.5 R |

*Primary Examiner*—Hezron E. Williams
*Assistant Examiner*—Jay L. Politzer

[57] ABSTRACT

The invention is an improvement of the method and apparatus used to test gas service lines at residential or business locations such that the application of air pressure into the system, the reading and monitoring of the gauge and the ultimate release of the air pressure from the system is conducted with the use of one device which is applied at one location.

1 Claim, 1 Drawing Sheet

GAS SERVICE TESTING GAUGE

TECHNICAL FIELD

The invention relates to improvements in the apparatus for testing a gas service line and to the method of testing a residential or commercial gas line service line.

BACKGROUND OF THE INVENTION

After installing or repairing a residential or commercial gas service system but before the system can be connected to the main gas line, the system must be air tested to make sure that there are no leaks in the piping. Currently, air pressure is applied by the gas company at the junction where the main gas line meets the system below the surface of the ground. The gas company must excavate the area, find the main gas line and apply the air pressure. A gauge measures the amount of air pressure applied to the system. The gas company monitors the testing gauge for the required amount of time (usually 15 minutes) and then releases the air pressure. The gauge indicates whether enough air pressure has been applied and the air pressure must be maintained for a certain amount of time to make sure that no leaks exist before it can be released. The gauge and the release valve are located at the place where the gas service enters the building not at the place where the air pressure is applied. This location is above the surface of the ground and in most cases nowhere near the street. It is therefore necessary for the gas company employee to climb out of the hole and walk to the building to apply the gauge, read and monitor the gauge and release the air pressure when the test is completed. The invention allows the gas company employee to perform all of the following steps at one location: (1) Apply the air pressure to test the system; (2) Read the gauge to determine if enough air pressure has been applied; (3) Monitor the gauge over the required amount of time; and (4) Release the pressure after the test is done.

SUMMARY OF THE INVENTION

The invention consists of a method of testing a residential or commercial gas service system for leaks or defects comprising the steps of: (a) connecting a gas service testing gauge to the main gas line; (b) introducing air into the system to create pressure; (c) measuring the pressure by the gauge; (d) monitoring the maintenance of a constant level of pressure for an appropriate length of time; (e) releasing the pressure. The Applicant claims the apparatus by which this testing is accomplished.

The invention consists of a plastic or PVC cap which attaches to the gas main on one end and on the other end it has an o-ring and a nut which connects it to various adapters and a cross joint. The cross joint has a horizontal bar on one end of which is engaged a gauge and the other end is engaged a valve to connect the device to an air source. At the top of the vertical bar of the cross, there is a release valve which is used to release the pressure in the system once the test is completed. The gauge is specific for the type of service to be tested, for instance a larger capacity gas service may require a gauge which has the capacity to measure higher pressures.

DESCRIPTION OF THE PREFERRED EMBODIMENT

Figure 1:
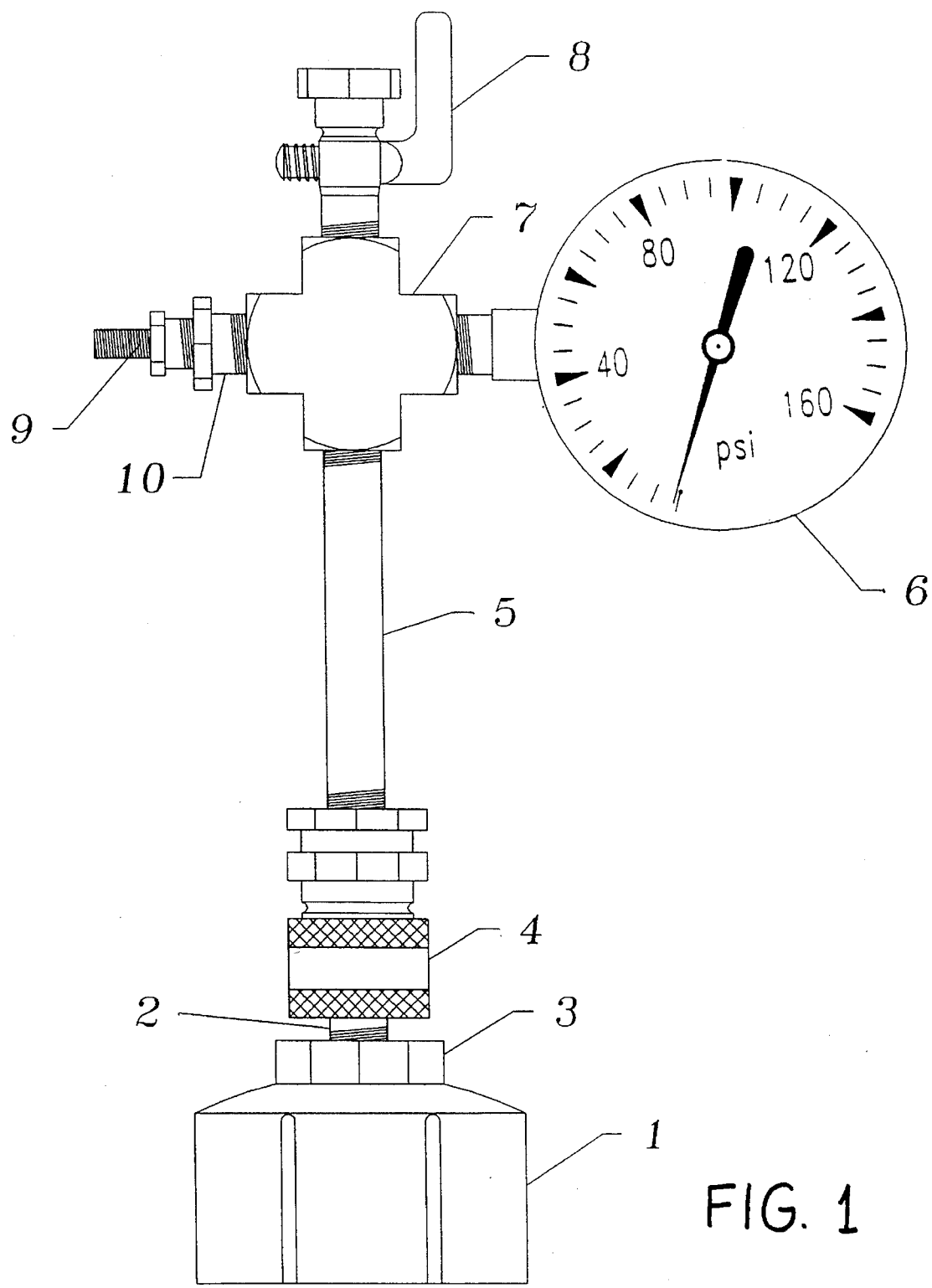
FIG. 1 is a front view of the apparatus of the gas service testing gauge.

According to FIG. 1, the invention when assembled consists of one complete device which when installed serves to facilitate the gas company's application of air pressure, monitoring testing of the system and release of the pressure. The plastic or PVC cap (1) constitutes the base of the invention and connects to the maim gas line. An o-ring (3) is inserted between the plastic cap (1) and the nut (2) to secure the connection. An adapter (4) is used to connect the plastic or PVC cap (1) with the steel nip (5). A cross (7) is installed on the end of the steel nip (5). On either horizontal end of the cross (7) is installed a tank valve (9) supported by a bushing (10). On the opposing end of the cross is a gauge (6). At the remaining end of the vertical bar of the cross (7) is a release valve (8) which is used to release the pressure within the system once the test is completed.

In preparing to test for leaks or defects in a residential or a commercial gas line, an individual would perform the following steps: (a) engage the PVC cap (1) by screwing it onto the main gas line for the service system; (b) engage the hose to the tank valve (9) and apply air pressure; (c) observe the gauge (6) and close the tank valve (9) when the desired pressure is reached according to the gauge (6); (d) monitor the gauge (6) over the required amount of time for the size of the system being tested; and (e) using the release valve (8) release the pressure within the system once the test is completed.

Having described the preferred embodiment of the invention with reference to the accompanying drawing, it is to be understood that the invention is not limited to that precise embodiment and that various changes and modifications may be effected therein by one skilled in the art without departing from the scope and spirit of the invention as defined in the appended claims.

| BILL OF MATERIAL | | |
| --- | --- | --- |
| ITEM | DESCRIPTION | QTY |
| 1 | PLASTIC CAP | 1 |
| 2 | MALE END OF QUICK CONNECT | 1 |
| 3 | RETAINING NUT | 1 |
| 4 | ⅜" QUICK DISCONNECT | 1 |
| 5 | ⅜" × 2½" NIP | 1 |
| 6 | 0–160 PSI GAUGE | 1 |
| 7 | ⅜" BRASS CROSS | 1 |
| 8 | ⅜" PET COCK | 1 |
| 9 | ¼" AIR TANK VALVE | 1 |
| 10 | ⅜ × ¼" BRASS REDUCER | 1 |

I claim:

1. Apparatus comprising a device for testing gas service consisting of a cap having a threaded end and an open end, said threaded end engages the main gas line and said open end receives a nut, within said nut is an o-ring, within said nut and o-ring is engaged an adapter, said adapter receiving a steel nip, said steel nip receiving a cross member having a vertical bar and a horizontal bar, said vertical bar having two vertical ends, one of said vertical ends receiving said steel nip, said remaining vertical end having a release valve, said horizontal bar having two ends, one of said horizontal ends having a tank valve for receiving an air source and a bushing and said other horizontal end having a gauge.

* * * * *